(12) United States Patent
Trowbridge

(10) Patent No.: US 10,271,478 B2
(45) Date of Patent: Apr. 30, 2019

(54) HYDROMECHANICAL TRANSMISSION SYSTEM FOR A HEADER OF AN AGRICULTURAL HARVESTER

(71) Applicant: CNH Industrial America LLC, New Holland, PA (US)

(72) Inventor: Jeffrey Trowbridge, Stevens, PA (US)

(73) Assignee: CNH Industrial America LLC, New Holland, PA (US)

( * ) Notice: Subject to any disclaimer, the term of this patent is extended or adjusted under 35 U.S.C. 154(b) by 106 days.

(21) Appl. No.: 15/403,860

(22) Filed: Jan. 11, 2017

(65) Prior Publication Data
US 2018/0192590 A1  Jul. 12, 2018

(51) Int. Cl.
| | | |
|---|---|---|
| F16D 31/02 | (2006.01) | |
| A01D 69/00 | (2006.01) | |
| F15B 1/04 | (2006.01) | |
| F15B 11/08 | (2006.01) | |
| F15B 13/02 | (2006.01) | |
| F16H 61/4096 | (2010.01) | |
| F15B 1/02 | (2006.01) | |
| A01D 41/14 | (2006.01) | |
| A01D 101/00 | (2006.01) | |

(52) U.S. Cl.
CPC .......... *A01D 69/005* (2013.01); *A01D 41/142* (2013.01); *F15B 1/024* (2013.01); *F15B 1/04* (2013.01); *F15B 11/08* (2013.01); *F15B 13/027* (2013.01); *F16H 61/4096* (2013.01); *A01D 2101/00* (2013.01); *F15B 2211/20546* (2013.01)

(58) Field of Classification Search
CPC .......... F15B 1/021; F15B 1/022; F15B 1/024; F16H 61/4078; F16H 61/4096; F16H 61/4139
USPC .......................................... 60/413, 414, 488
See application file for complete search history.

(56) References Cited

U.S. PATENT DOCUMENTS

| | | | |
|---|---|---|---|
| 4,009,556 A | | 3/1977 | Molzahn |
| 4,495,768 A | * | 1/1985 | Valavaara ............... F16D 31/06 60/414 |
| 2015/0334918 A1 | | 11/2015 | Daining |

FOREIGN PATENT DOCUMENTS

| | | |
|---|---|---|
| DE | 102013223988 A1 | 5/2015 |
| EP | 1046334 A1 | 10/2000 |
| EP | 2730157 A1 | 5/2014 |
| FR | 2553349 A1 | 4/1985 |
| GB | 1303672 A | 1/1973 |

(Continued)

OTHER PUBLICATIONS

European Search Report for European Application No. 18150861.5, dated May 15, 2018 (5 pages).

*Primary Examiner* — Michael Leslie
(74) *Attorney, Agent, or Firm* — Peter K. Zacharias; Patrick M. Sheldrake

(57) ABSTRACT

A header comprising an inlet line, a check valve, an accumulator and a hydromechanical transmission system is disclosed. The inlet line is used to receive a first pressure of hydraulic fluid and be in communication with the check valve. The accumulator is located downstream the check valve and in communication with the inlet valve. The hydromechanical transmission system includes a pressure line in communication with the inlet line that is downstream the accumulator and a closed hydraulic circuit in communication with the pressure line having a hydrostatic pump and a variable speed motor.

17 Claims, 3 Drawing Sheets

(56) References Cited

FOREIGN PATENT DOCUMENTS

WO 2015116892 A1 8/2015

* cited by examiner

HYDROMECHANICAL TRANSMISSION SYSTEM FOR A HEADER OF AN AGRICULTURAL HARVESTER

FIELD OF THE INVENTION

The present invention relates generally to a hydraulic system for a header of a plant cutting machine (e.g., a combine harvester). More specifically, the present invention relates to a hydromechanical transmission system having a hydrostatic pump and a variable speed motor for a header.

BACKGROUND OF THE INVENTION

Large vehicles, such as plant cutting machines, are typically operated using hydraulic systems because of the benefits of increased power and torque that the system can provide. In such hydraulic systems, a hydraulic pump generally pumps hydraulic fluid to various components of the large vehicle, such as the power steering in a combine and various actuators necessary to operate a header attached to the combine. However, the hydraulic system may not function properly when the hydraulic system cannot provide sufficient pressurized hydraulic fluid to the systems requiring hydraulic pressure. For example, a combine may necessitate additional hydraulic fluid to operate a specific function, such as lifting the header, which may cause insufficient hydraulic pressure to pass to a transmission system inside the header and consequently cause failure or harm to the transmission system.

Therefore, what is sought is a hydraulic system that can efficiently provide sufficient pressurized hydraulic fluid to specific components, such as a transmission system of a header. The disclosed invention overcomes the disadvantages referenced above by providing a header with a hydromechanical transmission in combination with an accumulator.

BRIEF SUMMARY OF THE INVENTION

In accordance with a first exemplary embodiment of the present invention, there is provided a header for an agricultural harvesting machine that comprises an inlet line, a check valve, an accumulator and a hydromechanical transmission system. The inlet line is used for receiving a first pressure of hydraulic fluid. The check valve is in communication with the inlet line. The accumulator is downstream the check valve and in communication with the inlet line. The hydromechanical transmission system includes a pressure line and a closed hydraulic circuit. The pressure line is in communication with the inlet line downstream the accumulator. The closed hydraulic circuit is in communication with the pressure line and includes a hydrostatic pump and a variable speed motor.

An aspect of the first exemplary embodiment of the present invention is that the header further comprises a drain line in communication with the hydromechanical transmission system for receiving an excess pressure of hydraulic fluid. Additionally, the closed hydraulic circuit further includes a first circuit line in communication with the hydrostatic pump and the variable speed motor and a second circuit line in communication with the hydrostatic pump and the variable speed motor. The first circuit line and the second circuit line are in communication with the pressure line. Alternatively, the closed hydraulic circuit can instead include a first circuit line in communication with the hydrostatic pump and the variable speed motor, a second circuit line in communication with the hydrostatic pump and the variable speed motor, and a third circuit line in communication with the pressure line, the first circuit line, and the second circuit line.

Another aspect of the first exemplary embodiment of the present invention is that the hydrostatic pump is configured to receive a charge pressure and output an operating pressure greater than the charge pressure. Additionally, the variable speed motor is configured to receive the operating pressure and output a pressure lower than the operating pressure. Furthermore, the accumulator is configured to output a pressure greater than a charge pressure necessary to operate the closed hydraulic circuit.

In another aspect of the first exemplary embodiment of the present invention, the check valve is configured to be in an open position when the first pressure is greater than or equal to a charge pressure necessary to operate the closed hydraulic circuit. Additionally, the check valve is configured to be in a closed position when the first pressure is less than a charge pressure necessary to operate the closed hydraulic circuit. Furthermore, the accumulator is configured to provide hydraulic pressure to the pressure line when the check valve is in a closed position.

In yet another aspect of the first exemplary embodiment of the present invention, the header further comprises a pressure reducing valve in communication with the inlet line and downstream the check valve. The pressure reducing valve is also upstream the hydromechanical transmission system. Furthermore, there may also be a pressure transducer downstream the pressure reducing valve. Additionally, the header further comprises a pressure transducer in communication with the inlet line and downstream the check valve. The pressure transducer is also upstream the hydromechanical transmission system. Furthermore, there may also be a pressure reducing valve upstream the pressure transducer.

Other features and advantages of the present invention will be apparent from the following more detail description of the exemplary embodiment, taken in conjunction with the accompanying drawings which illustrate, by way of example, the principles of the invention.

BRIEF DESCRIPTION OF THE SEVERAL VIEWS OF THE DRAWINGS

The foregoing summary, as well as the following detailed description of the exemplary embodiments of the invention, will be better understood when read in conjunction with the appended drawings. For the purpose of illustrating the invention, there are shown in the drawings exemplary embodiments. It should be understood, however, that the invention is not limited to the precise arrangements and instrumentalities shown.

DETAILED DESCRIPTION OF THE INVENTION

Figure 1:
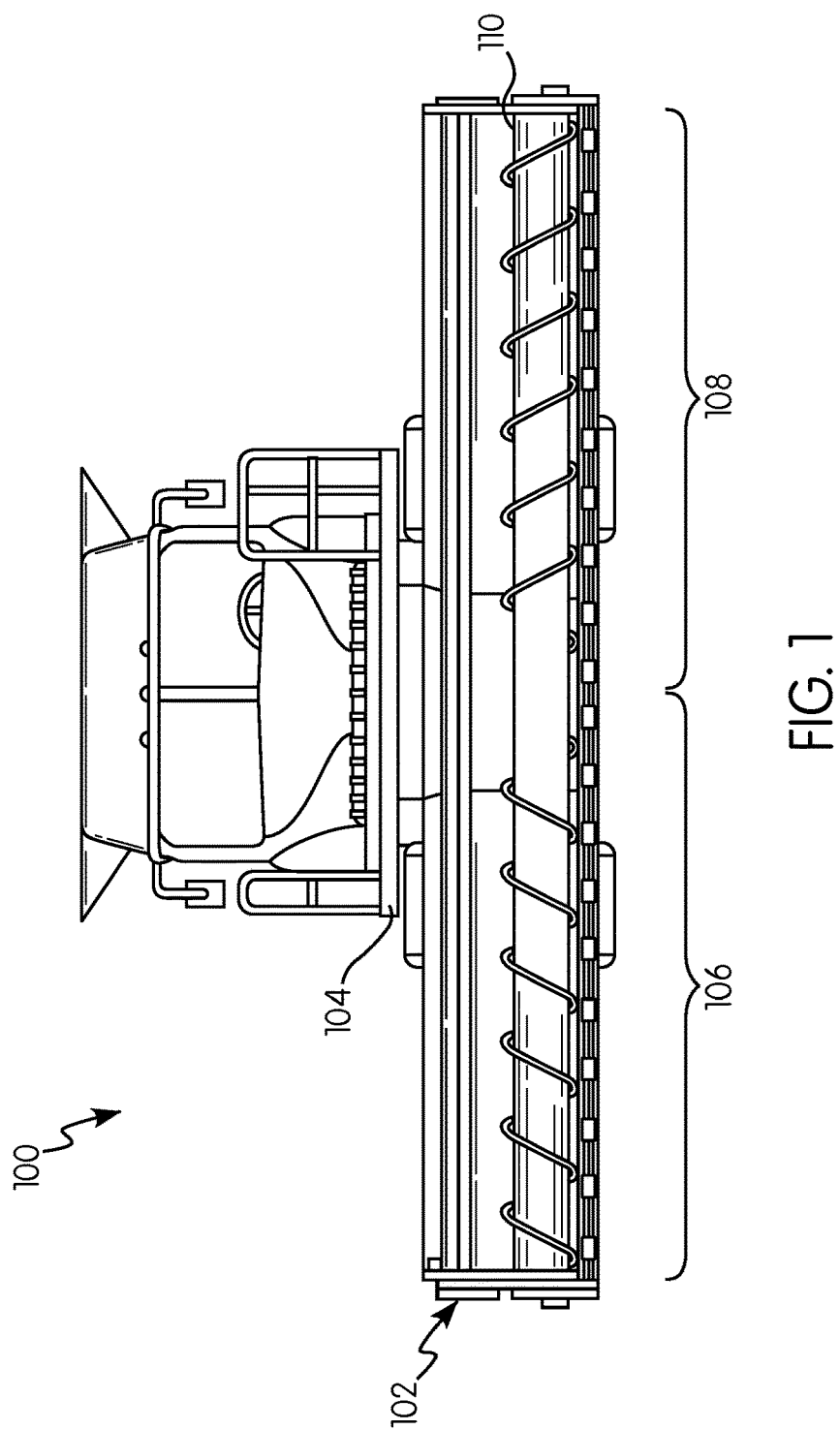
FIG. 1 is a front elevation view of an agricultural harvester including a header applicable to the present invention.

Reference will now be made in detail to the various embodiments of the present invention illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the present invention in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The header of the present invention is applicable to a variety of crops, including but not limited to wheat, soybeans and small grains. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

Throughout this disclosure, various aspects of the present invention can be presented in a range format. It should be understood that the description in range format is merely for convenience and brevity and should not be construed as an inflexible limitation on the scope of the present invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the present invention may be combined in any suitable manner in one or more embodiments. One skilled in the relevant art will recognize, in light of the description herein, that the present invention can be practiced without one or more of the specific features or advantages of a particular exemplary embodiment. In other instances, additional features and advantages may be recognized in certain embodiments that may not be present in all exemplary embodiments of the present invention.

Figure 2:
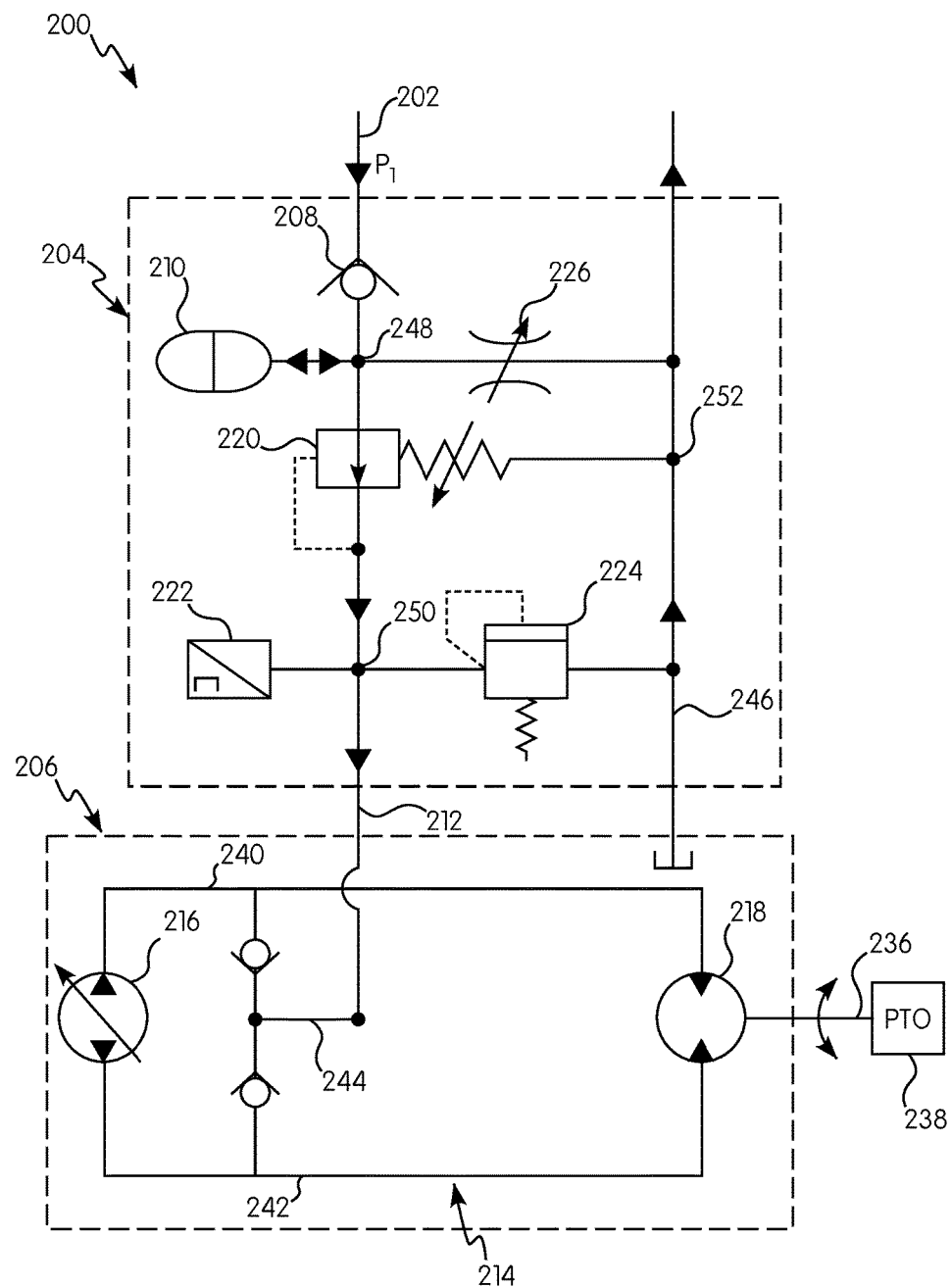
FIG. 2 is a schematic diagram of a hydraulic system applicable to the header of FIG. 1 in accordance with an exemplary embodiment of the present invention.

Referring now to the drawings, in accordance with an exemplary embodiment, the present invention provides a header 102 for an agricultural harvester 100 having a hydraulic system 200. FIG. 2 illustrates a schematic view of the hydraulic system 200.

The hydraulic system 200 includes an inlet line 202 for receiving a first pressure of hydraulic fluid, a hydraulic manifold 204 and a hydromechanical transmission system 206. The hydraulic manifold 204 includes a check valve 208 that is in communication with the inlet line 202 and an accumulator 210 that is downstream the check valve 208 and in communication with the inlet line 202. The hydromechanical transmission system 206 includes a pressure line 212 in communication with the inlet line 202 and downstream the accumulator 210. The hydromechanical transmission system 206 also includes a closed hydraulic circuit 214 that is in communication with the pressure line 212. The closed hydraulic circuit includes a hydrostatic pump 216 and a variable speed motor 218.

In accordance with an aspect of the present embodiment, the inlet line 202 is configured to be connectible with a hydraulic fluid source having a first pressure, hereafter additionally referred to as $P_1$. Such a hydraulic fluid source can be supplied from a combine 104 to which the header 102 can be attached.

The check valve 208 has an inlet in communication with the inlet line 202. The check valve 208 is configured to have an open position and a closed position. In the open position, the inlet is open to allow passage of the pressurized hydraulic fluid. In the closed position, the inlet is closed to prevent passage of the pressurized hydraulic fluid. The check valve 208 requires a specific cracking pressure, herein referred alternatively as $P_v$, to maintain its open position. The cracking pressure is at most a minimum charge pressure, hereafter referred to as $P_c$, for the safe operation of the hydrostatic pump 216.

The accumulator 210 is a pressure storage reservoir that has an inner volume for storing stored hydraulic fluid. The accumulator 210 generates and stores pressurized hydraulic fluid for use when the inlet line's 202 pressure is insufficient. The accumulator 210 is further configured such that when the pressure in the inlet line 202 is below its normal operative pressure, which may be $P_c$, the check valve 208 closes and the stored pressurized hydraulic fluid is released into the inlet line 202 to bring the pressure in the inlet line 202 to its normal operative pressure. In other words, the accumulator 210 is configured to provide hydraulic pressure to the pressure line 212 when the check valve 208 is in a closed position.

The hydraulic manifold 204 can also include a pressure reducing valve 220, a pressure transducer 222, a pressure relief valve 224 and a bleed valve 226. The pressure transducer 222, the pressure reducing valve 220 and the pressure relief valve 224 serve to keep the pressure inside the hydraulic manifold 204 and the inlet line 202 within appropriate safety levels and/or at appropriate pressures for operating the hydromechanical transmission system 206. The bleed valve 226 allows for safe discharge of hydraulic fluid from the accumulator 210 for the purpose of servicing the same.

The hydromechanical transmission 206 includes a pressure line 212 and a closed hydraulic circuit 214. The pressure line 212 is configured to be in communication with the inlet line 202 and the hydraulic circuit 214. The closed hydraulic circuit 214 includes the hydrostatic pump 216 and the variable speed motor 218.

The hydrostatic pump 216 includes an inlet and an outlet. The hydrostatic pump 216 requires a charge pressure ($P_c$) for safe operation. Anything below the charge pressure could cause harm to the hydrostatic pump 216 and necessitate expensive and untimely replacement of the hydrostatic pump 216. The hydrostatic pump 216 operates by taking in pressurized hydraulic fluid, typically at the charge pressure, and outputting an equal or higher pressurized hydraulic fluid (i.e., an operating pressure) at an operating variable flow rate, hereafter referred to as an operating flow.

The variable speed motor 218 includes an inlet and an outlet. It operates by taking in the operating flow from the hydrostatic pump 216. The value of the operating variable flow rate determines the speed at which an output shaft 236, which is connected to, for example, a variable output 238 in the header 102, operates. In sum, the variable speed motor 218 operates via pressurized hydraulic fluid output from the hydrostatic pump 216, and subsequently outputs a lower pressurized hydraulic fluid ($P_L$).

It is appreciated by those skilled in the art that the hydrostatic pump 216 and variable speed motor 218 can reverse their respective inlets and respective outlets. In other words, the hydrostatic pump 216 can pump pressurized hydraulic fluid out of either of its inlet or outlet, and the variable speed motor 218 can receive the pumped pressurized hydraulic fluid in either its inlet or outlet, depending on the direction the closed hydraulic circuit 214 is engaged. It is also appreciated that the direction that the variable speed motor 218 operates, for example rotating clockwise versus counterclockwise, is dependent on which direction the pressurized hydraulic fluid travels. Thus, the closed hydraulic circuit 214, which the hydrostatic pump 216 and the variable speed motor 218 are a part of, is reversible.

Figure 3:
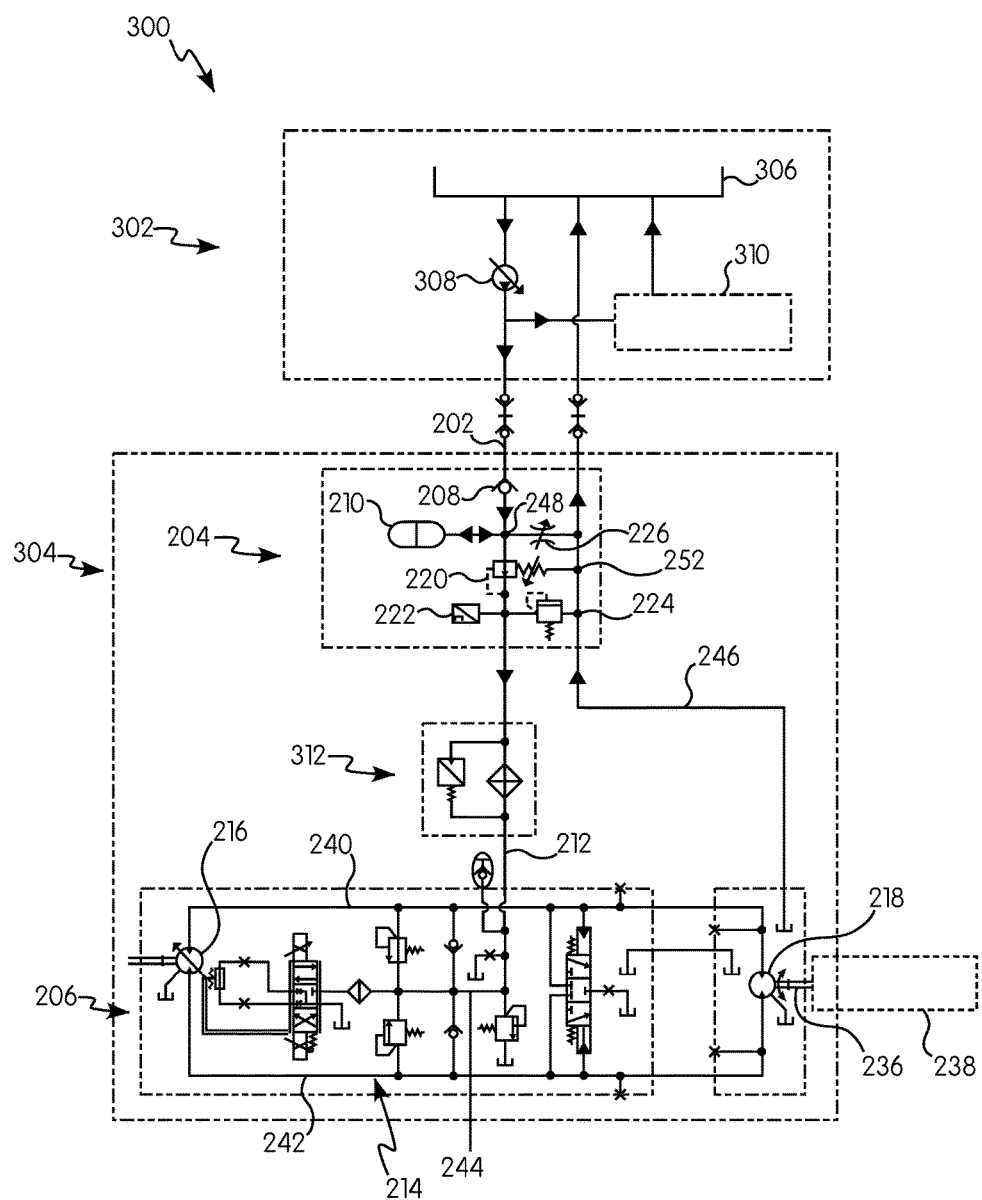
FIG. 3 is a schematic diagram of a hydraulic system applicable to the agricultural harvester of FIG. 1 in accordance with another exemplary embodiment of the present invention.

The closed hydraulic circuit 214 includes the hydrostatic pump 216 and variable speed motor 218 as shown in FIG. 3. The closed hydraulic circuit 214 also includes the first circuit line 240 and the second circuit line 242 which are connected to the pressure line 212. The pressure line 212 may alternatively feed into a third circuit line 244 which is connected to the first and second circuit lines 240, 242. The hydraulic circuit 214 is considered a "closed hydraulic circuit" because the hydrostatic pump 216 and the variable speed motor 218 are directly connected to each other's respective inlets and outlets by way of the first circuit line 240 and second circuit line 242. It is appreciated that the closed hydraulic circuit 214 can also include other components, such as check valves, in communication with the first, second or third circuit lines 240, 242, 244.

Additionally, the hydromechanical transmission system 206 includes a case drain flow line 246. The case drain flow line 246 serves to drain excess pressurized hydraulic fluid and/or wasted hydraulic fluid from the hydraulic system 200 back to a hydraulic fluid source located, for example, in the combine 104. In other words, the drain line 246 is in communication with the hydromechanical transmission system 206 for receiving an excess pressure of hydraulic fluid.

Referring again to FIG. 2, the hydraulic system 200 is configured as shown. Specifically, in the exemplary embodiment, the inlet line 202 is connectable to a hydraulic fluid source for fluid communication therewith and extends into the hydraulic system 200. In sum, the inlet line 202 extends into the hydraulic manifold 204 and is in communication with the check valve 208. The accumulator 210 is downstream from the check valve 208 and also in communication with the inlet line 202 at junction 248.

The pressure reducing valve 220 is downstream from the junction 248 and in communication with the inlet line 202. The pressure transducer 222 is downstream the pressure reducing valve 220 and also in communication with the inlet line 202. In sum, the header 102 comprises a pressure reducing valve 220 in communication with the inlet line 202 and downstream the check valve 208. The pressure reducing valve 220 is upstream the hydromechanical transmission system 206. Also, the header 102 comprises a pressure transducer 222 in communication with the inlet line 202 and downstream the check valve 208. The pressure transducer 222 is upstream the hydromechanical transmission system 206.

Extending from the hydraulic manifold 204 is the pressure line 212 that feeds into the hydromechanical transmission system 206. The pressure line 212 bifurcates into the first circuit line 240 and the second circuit line 242. In an aspect of the present exemplary embodiment, the pressure line 212 can instead feed into a third circuit line 244 of the closed hydraulic circuit 214. In this embodiment, the third circuit line 244 is in communication with both the first and second circuit lines 240, 242. The first circuit line 240 is connected to the hydrostatic pump's 216 inlet and the variable speed motor's 218 outlet. The second circuit line 242 is connected to the hydrostatic pump's 216 outlet and the variable speed motor's 218 inlet. In other words, the first circuit line 240 is in communication with the hydrostatic pump 216 and the variable speed motor 218, the second circuit line 242 is in communication with the hydrostatic pump 216 and the variable speed motor 218, the first circuit line 240 and the second circuit line 242 are in communication with the pressure line 212. Alternatively, the third circuit line 244 is in communication with the pressure line 212, the first circuit line 240, and the second circuit line 242.

The variable speed motor 218 is attached to a variable output 238 by way of, for example, an output shaft 236 for operating another component in the header 102, such as a cutter assembly.

Extending from the variable speed motor 218 is the case drain flow line 246 which is in communication with the pressure relief valve 224 and the bleed valve 226 inside the hydraulic manifold 204. The pressure relief valve 224 is in communication with the pressure transducer 222 at a junction 250 within the hydraulic manifold 204. The case drain flow line 246 is also in communication with the pressure reducing valve 220 at a junction 252 inside the hydraulic manifold 204. The bleed valve 226 is in communication with the accumulator 210 and the inlet line 202 at the junction 248 inside the hydraulic manifold 204. The case drain flow line 246 extends out of the hydraulic system 200 and can be configured to be connectable to a hydraulic fluid source located in, for example, the combine 104.

The hydraulic system 200 operates by maintaining at least a minimum pressure such as, for example, the charge pressure for the hydrostatic pump 216. This is accomplished by having the first pressure, i.e. $P_1$, pumped through the inlet line 202 into the hydraulic system 200. The inlet line 202 feeds into the check valve 208. If $P_1$ is equal to or greater than the cracking pressure, $P_v$, of the check valve 208, the check valve 208 remains open and allows the pressurized hydraulic fluid to pass through. If $P_1$ is less than $P_v$, the check valve 208 is closed and the hydromechanical transmission system 206 receives pressurized hydraulic fluid solely from the accumulator 210, as described in further detail below.

If $P_1$ is greater than a predetermined charge pressure $P_c$, the accumulator 210, if it is not already full, stores pressured hydraulic fluid, i.e. stored hydraulic fluid. If $P_1$ is less than $P_c$, the accumulator 210 releases its stored pressurized hydraulic fluid into the inlet line 202 to bring the pressure to, at least, $P_c$. In other words, the accumulator is configured to output a pressure greater than a charge pressure necessary to operate the closed hydraulic circuit.

The pressurized hydraulic fluid in the inlet line 202 then passes through the pressure reducing valve 220 and the pressure transducer 222, which can operate in tandem with the pressure relief valve 224. If $P_1$ exceeds the safety levels of the inlet line 202 or the hydraulic manifold 204, the hydraulic manifold 204 drains off sufficient pressurized hydraulic fluid into the case drain flow line 246. Put differently, if there is a sudden rise of supply pressure to the hydraulic manifold 204, the pressure relief valve 224 clips the pressure peaks that are not absorbed by the accumulator 210.

The resulting pressurized hydraulic fluid enters into the closed hydraulic circuit 214 through the pressure line 212 and/or the third circuit line 244. The pressurized hydraulic fluid then flows into either the first circuit line 240 or the second circuit line 242, the flow of which is directed by whichever circuit line has a lower pressure, referred hereafter as $P_L$, which restores the pressure in that circuit line to at least $P_c$.

The hydraulic fluid in the closed hydraulic circuit 214, having a pressure of at least $P_c$, flows into the hydrostatic pump 216. The hydrostatic pump 216 pumps out pressurized hydraulic fluid at a higher pressure than the charge pressure ($P_o$) and at a variable flow rate, which flows through the other of the first or second circuit line 240, 242 to the variable speed motor 218. The variable speed motor 218 actuates the output shaft 236 to operate the variable output 238 at a rate depending on the variable flow rate. Any wasted or leaked hydraulic fluid is then released into the case drain flow line 246 to be returned to the hydraulic fluid source. The remainder of the pressurized hydraulic fluid, which is at $P_L$, a pressure lower than $P_o$, is released back into the closed hydraulic circuit 214. The lower pressurized hydraulic fluid is thereafter fed back into the hydrostatic pump 216 and the cycle repeats itself.

The accumulator 210 serves to function as a safety measure to ensure the safe operation of the hydraulic circuit 214. Specifically, if $P_1$ drops too low or the check valve 208 is closed, the accumulator 210 serves to return the pressure in the inlet line 202 to at least the charge pressure $P_c$. For example, if the a variable flow pump upstream the inlet line 202 has a momentary flow limitation event (such as, for example, having too many other hydraulic components active at the same time), the check valve 208 will close and the accumulator 210 will provide momentary flow to the hydromechanical transmission system 206. If the minimum pressure or charge pressure is maintained, the hydrostatic pump will not be harmed and thereby continue to function properly.

It can be appreciated by those skilled in the art that while the present invention was described with respect to a combine 104 and header 102, the present invention can be incorporated into any hydraulic system.

Furthermore, as shown in FIGS. 1 and 3, additional components can be incorporated into the agricultural harvester 100 that utilize the hydraulic circuit 200, and can be arranged into a combine system 300.

Additionally, for exemplary purposes only, the agricultural harvester 100 is illustrated as a combine harvester. The harvester 100 includes a combine 104 and a header 102. The combine 104 and header 102 house a series of components such as engines, transmissions, actuators, power trains, cutting assemblies 106, 108, harvesting reels 110 and so forth, that may require hydraulic fluid to operate. These components will hereafter be collectively referred to as other hydraulic components 310. Therefore, it can be appreciated that during operational use, the hydrostatic pump 216 may get insufficient pressurized hydraulic fluid when other aspects of the combine 104 or header 102 draw hydraulic power.

The combine system 300 is configured as shown in FIG. 3 and includes a combine circuit 302 and a header circuit 304. The combine circuit 302 includes a hydraulic reservoir 306, a variable flow pump 308 and one or more hydraulic components 310. The header circuit 304 includes the hydraulic system 200 described above and a charge filter 312. Additionally, the closed hydraulic circuit 214 can also include various other valves and flow lines to maintain the efficiency and life of the hydromechanical transmission system 206. Interconnecting the combine system 300 are a series of flow lines designed to transfer pressurized hydraulic fluid from one component to another.

While the present invention has been described with reference to exemplary embodiments, it will be appreciated by those skilled in the art that various changes may be made and equivalents may be substituted for elements thereof without departing from the scope of the present invention. Additionally, features described in one manner may instead be accomplished by known techniques in the art, such using different valves.

In addition, modifications may be made to adapt a particular situation or material to the teachings of the present invention without departing from the essential scope thereof. For example, the type of hydrostatic pump may be changed, which would alter the charge pressure. It is to be understood, therefore, that the present invention is not be limited to the particular exemplary embodiments disclosed, but it is intended to cover modifications within the spirit and scope of the present invention as defined by the appended claims.

I claim:

1. A header for an agricultural harvesting machine comprising:
    an inlet line for receiving a first pressure of hydraulic fluid;
    a check valve in communication with the inlet line;
    an accumulator downstream of the check valve and in communication with the inlet line; and
    a hydromechanical transmission system including:
        a pressure line in communication with the inlet line downstream of the accumulator, and
        a closed hydraulic circuit in communication with the pressure line, the closed hydraulic circuit having:
            a hydrostatic pump;
            a variable speed motor;
            a first circuit line in communication with the hydrostatic pump and the variable speed motor; and
            a second circuit line in communication with the hydrostatic pump and the variable speed motor,
            wherein the first circuit line and the second circuit line are in communication with the pressure line.

2. The header of claim 1, further comprising a drain line in communication with the hydromechanical transmission system for receiving an excess pressure of hydraulic fluid.

3. The header of claim 1, wherein the hydrostatic pump is configured to receive a charge pressure and output an operating pressure greater than the charge pressure.

4. The header of claim 3, wherein the variable speed motor is configured to receive the operating pressure and output a pressure lower than the operating pressure.

5. The header of claim 1, wherein the accumulator is configured to output a pressure greater than a charge pressure necessary to operate the closed hydraulic circuit.

6. The header of claim 1, wherein the check valve is configured to be in an open position when the first pressure is greater than or equal to a charge pressure necessary to operate the closed hydraulic circuit.

7. The header of claim 1, wherein the check valve is configured to be in a closed position when the first pressure is less than a charge pressure necessary to operate the closed hydraulic circuit.

8. The header of claim 1, wherein the accumulator is configured to provide hydraulic pressure to the pressure line when the check valve is in a closed position.

9. The header of claim 1, further comprising a pressure reducing valve in communication with the inlet line and downstream of the check valve.

10. The header of claim 9, wherein the pressure reducing valve is upstream of the hydromechanical transmission system.

11. The header of claim 10, further comprising a pressure transducer downstream of the pressure reducing valve.

12. The header of claim 1, further comprising a pressure transducer in communication with the inlet line and downstream of the check valve.

13. The header of claim 12, wherein the pressure transducer is upstream of the hydromechanical transmission system.

14. The header of claim 3, further comprising a pressure reducing valve upstream of the pressure transducer.

15. The header of claim 1, wherein the hydromechanical transmission further includes a first check valve and a second check valve, wherein the first circuit line is coupled to the pressure line via the first check valve, and the second circuit line is coupled to the pressure line via the second check valve.

16. The header of claim 1, wherein the hydromechanical transmission system further includes a third circuit line, wherein the first circuit line and the second circuit line are in communication with the pressure line via the third circuit line.

17. The header of claim 16, wherein the hydromechanical transmission further includes a first check valve and a second check valve, wherein the first circuit line is coupled to the pressure line via the first check valve and the third circuit line, and the second circuit line is coupled to the pressure line via the second check valve and the third circuit line.

* * * * *